United States Patent
Wang et al.

(10) Patent No.: US 10,893,039 B2
(45) Date of Patent: Jan. 12, 2021

(54) PHONE NUMBER PROTECTION SYSTEM

(71) Applicant: International Business Machines Corporation, Armonk, NY (US)

(72) Inventors: Hui Wang, Beijing (CN); Mai Zeng, Beijing (CN); Yu Mei Dai, Beijing (CN); Xin Xin Lv, Beijing (CN); Yong Wu, Beijing (CN); Si Jun Gz Zhou, Wuhan (CN); De Ting Hu, Beijing (CN); Zhi Jun Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 15/716,716

(22) Filed: Sep. 27, 2017

(65) Prior Publication Data
US 2019/0097997 A1    Mar. 28, 2019

(51) Int. Cl.
*H04L 29/06* (2006.01)
*H04L 9/30* (2006.01)
(Continued)

(52) U.S. Cl.
CPC ...... *H04L 63/0823* (2013.01); *G06F 21/6245* (2013.01); *G06F 21/88* (2013.01);
(Continued)

(58) Field of Classification Search
CPC ... H04L 63/0823; H04L 63/06; H04L 9/3239; H04L 9/3249; H04L 9/302; H04L 9/14;
(Continued)

(56) References Cited

U.S. PATENT DOCUMENTS 8,311,513 B1 * 11/2012 Nasserbakht ........ G06Q 10/109
455/410
8,819,293 B2 * 8/2014 Mobin ................ H04L 65/1096
709/249
(Continued)

FOREIGN PATENT DOCUMENTS

| CN | 103906039 A | 7/2014 | |
| CN | 105701372 A | 6/2016 | |
| WO | WO-2004098165 A1 * | 11/2004 | ............ H04M 15/06 |

OTHER PUBLICATIONS (Dick Ng'ambi, et al., ICEL2012—7th International Conference on E-Learning: ICEL2012, Jun. 2012, retrieved on Apr. 3, 2020, hereinafter Ng'ambi).*
(Continued)

*Primary Examiner* — Farid Homayounmehr
*Assistant Examiner* — Raied A Salman
(74) *Attorney, Agent, or Firm* — Jared C. Chaney

(57) ABSTRACT

This disclosure provides a method and system for protecting phone numbers from being exposed to third parties. The method comprises receiving a request, from a caller smart phone, for establishing telephone communication with a callee smart phone, wherein the request contains a code to designate the smart phone of the callee. The method further comprises checking whether the code is formally provided to the callee. The method further comprises: in response to determining that the code is formally provided to the caller, retrieving the phone number of the caller and the phone number of the callee based on the request and establishing a phone call connection via a cellular network with the phone number of the caller and the phone number of the callee.

14 Claims, 4 Drawing Sheets

(51) Int. Cl.
*H04L 9/32* (2006.01)
*G06F 21/88* (2013.01)
*G06F 21/62* (2013.01)
*H04W 12/10* (2009.01)

(52) U.S. Cl.
CPC .............. *H04L 9/30* (2013.01); *H04L 9/3239* (2013.01); *H04L 9/3242* (2013.01); *H04L 63/0442* (2013.01); *H04L 63/10* (2013.01); *H04L 63/123* (2013.01); *H04W 12/10* (2013.01); *H04L 2209/38* (2013.01); *H04L 2209/80* (2013.01)

(58) Field of Classification Search
CPC ... H04L 63/0442; H04L 63/10; H04L 63/123; H04L 9/30; H04L 9/3242; H04L 2209/38; H04L 2209/80; H04L 63/083; H04L 63/0838; H04L 9/0618; H04L 9/3236; H04L 9/3297; H04W 12/06; H04W 12/04; H04W 12/10; G06O 20/0655; G06O 20/3829; G06F 21/6245; G06F 21/88; G06F 17/30011
USPC .......................................... 713/156; 709/249
See application file for complete search history.

(56) References Cited

U.S. PATENT DOCUMENTS

| | | | | |
|---|---|---|---|---|
| 9,319,391 | B2* | 4/2016 | Wentworth | G06F 21/31 |
| 9,544,431 | B2* | 1/2017 | Zhang | H04W 4/16 |
| 2006/0109101 | A1* | 5/2006 | Genda | G06F 21/88 |
| | | | | 340/521 |
| 2007/0038516 | A1 | 2/2007 | Apple et al. | |
| 2007/0217408 | A1* | 9/2007 | Sahashi | H04L 29/12103 |
| | | | | 370/389 |
| 2008/0022418 | A1* | 1/2008 | Wei | G06F 21/88 |
| | | | | 726/35 |
| 2008/0304642 | A1* | 12/2008 | Hiraishi | H04M 1/575 |
| | | | | 379/142.06 |
| 2009/0044025 | A1* | 2/2009 | She | G06Q 20/3563 |
| | | | | 713/193 |
| 2011/0311052 | A1* | 12/2011 | Myers | H04L 63/10 |
| | | | | 380/270 |
| 2014/0323166 | A1* | 10/2014 | Zhang | H04L 51/04 |
| | | | | 455/466 |
| 2015/0140977 | A1* | 5/2015 | Zhang | H04W 12/12 |
| | | | | 455/415 |
| 2015/0264639 | A1 | 9/2015 | Hanson et al. | |
| 2015/0295930 | A1* | 10/2015 | Dixon | H04L 63/126 |
| | | | | 713/181 |
| 2016/0148212 | A1 | 5/2016 | Dimmick | |
| 2016/0155148 | A1* | 6/2016 | Ismail | H04M 3/2218 |
| | | | | 705/14.53 |
| 2016/0217436 | A1* | 7/2016 | Brama | G06Q 20/10 |
| 2016/0275461 | A1* | 9/2016 | Sprague | H04L 63/126 |
| 2017/0366516 | A1 | 12/2017 | Pattanaik et al. | |
| 2018/0101906 | A1* | 4/2018 | McDonald | G06Q 20/204 |
| 2018/0152665 | A1* | 5/2018 | Zuo | H04N 7/147 |
| 2018/0255130 | A1* | 9/2018 | Kozloski | G06F 7/14 |
| 2019/0068783 | A1* | 2/2019 | Archer | H04M 7/0096 |
| 2019/0097997 | A1* | 3/2019 | Wang | H04L 63/10 |
| 2019/0097998 | A1* | 3/2019 | Wang | H04L 63/10 |
| 2019/0123889 | A1* | 4/2019 | Schmidt-Karaca | |
| | | | | H04L 9/3239 |
| 2019/0319956 | A1* | 10/2019 | Yang | H04W 12/0804 |

OTHER PUBLICATIONS

Srishti Gupta, et al., Exploiting Phone Numbers and Cross-Application Features in Targeted Mobile Attacks, Oct. 2016, SPSM '16: Proceedings of the 6th Workshop on Security and Privacy in Smartphones and Mobile Devices, pp. 73-82.*

Wang et al., "Phone Number Protection System," U.S. Appl. No. 15/813,231, filed Nov. 15, 2017.

Peterson et al., "A Blockchain-Based Approach to Health Information Exchange Networks," healthit.gov, Mayo Clinic, 2016, 10 pages.

* cited by examiner

PHONE NUMBER PROTECTION SYSTEM

BACKGROUND

Currently, preventing phone numbers from being exposed to third parties is an ongoing issue, where exposed phone numbers are often used for making unsolicited telemarketing calls and calls relating to fraud.

SUMMARY OF THE INVENTION

An embodiment of the present invention relates to techniques of information protection and, more specifically, to a method, a system and a computer program product for protecting phone number from being exposed to third parties.

In an exemplary embodiment, the method includes receiving a request, from a caller smart phone, for establishing telephone communication with a callee smart phone, wherein the request contains a code to designate the callee smart phone. The method further comprises checking whether the code is formally provided to the caller. The method further comprises: in response to determining that the code is formally provided to the caller, retrieving the phone number of the caller and the phone number of the callee based on the request and establishing a phone call connection via a cellular network with the phone number of the caller and the phone number of the callee.

In an exemplary embodiment, the system includes one or more processors; a memory coupled to at least one of the one or more processors, a set of computer program instructions stored in the memory and executed by at least one of the one or more processors in order to perform actions of: receiving a request, from a caller smart phone, for establishing telephone communication with a callee smart phone, wherein the request contains a code to designate the smart phone of the callee; checking whether the code is formally provided to the caller; and in response to determining that the code is formally provided to the caller retrieving the phone number of the caller and the phone number of the callee based on the request; and establishing a phone call connection via a cellular network with the phone number of the caller and the phone number of the callee.

In an exemplary embodiment, the computer program product includes a computer readable storage medium having program instructions embodied therewith, wherein the program instructions being executable by a device to perform a method. The method comprises: receiving a request, from a caller smart phone, for establishing telephone communication with a callee smart phone, wherein the request contains a code to designate the callee smart phone. The method further comprises checking whether the code is formally provided to the caller. The method further comprises: in response to determining that the code is formally provided to the caller, retrieving the phone number of the caller and the phone number of the callee based on the request and establishing a phone call connection via a cellular network with the phone number of the caller and the phone number of the callee.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

Figure 1:
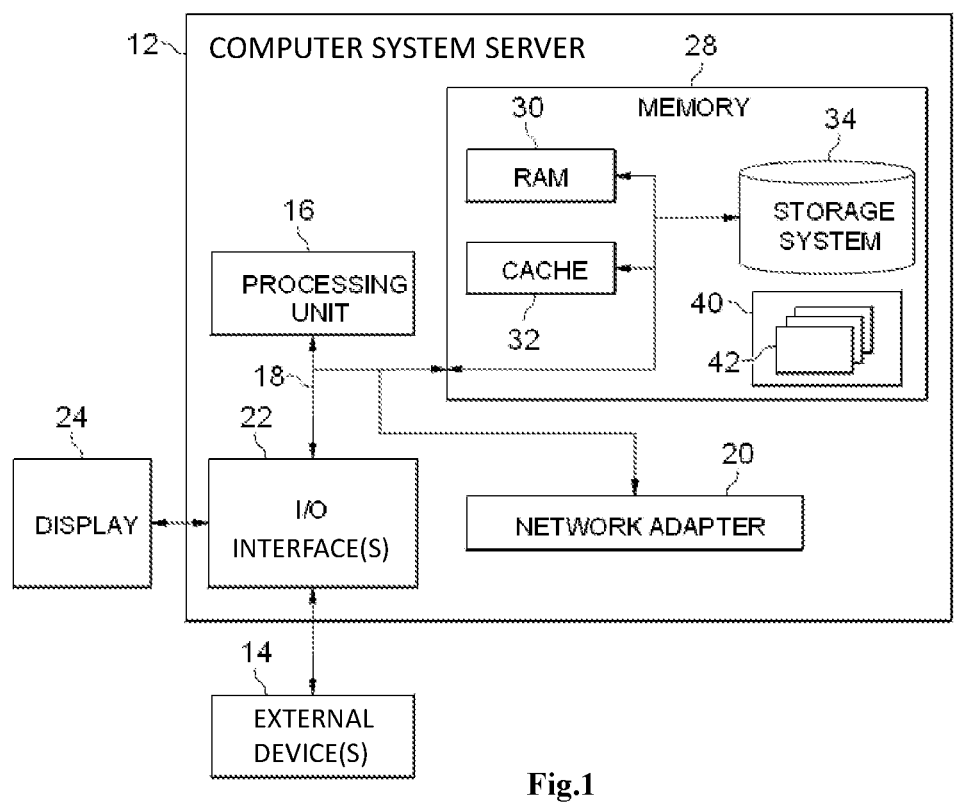
FIG. 1 shows an exemplary computer system which is applicable to implement embodiments of the present invention.

Referring now to FIG. 1, in which an exemplary computer system/server 12 which is applicable to implement the embodiments of the present invention is shown. FIG. 1 is also adapted to depict an illustrative example of a portable electronic device such as a communication device which is applicable to implement the embodiments of the present invention. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processing units 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/ non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, digital versatile disk read only memory (DVD-ROM) or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
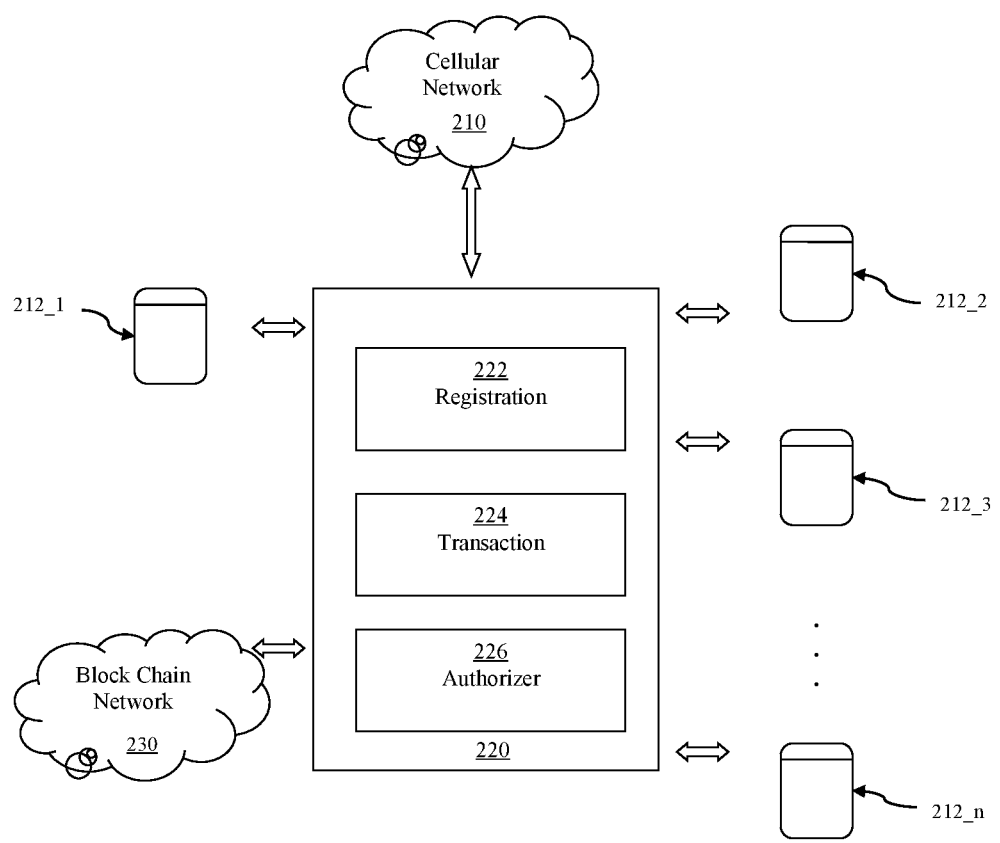
FIG. 2 shows an example data processing environment in which embodiments of the present invention may be implemented.

Refer now to FIG. 2, which shows an example data communication environment in which embodiments of the present invention may be implemented.

The environment illustrated in FIG. 2 comprises a cellular network 210 and a plurality of smart phones 212_1, 212_2, 212_3, . . . and 212_n. In an embodiment, each of the smart phones has a unique phone number. Users of the smart phones may conduct telephone communications in traditional way; in other words, a user may use his/her smart phone to dial the phone number of the smart phone of another user via cellular network 210 so that a phone call is placed between them.

In traditional way of telephone communications where people make phone calls directly via cellular network 210 as described above, if a user's phone number is exposed to a stranger, it might be abused. For example, the stranger may use the phone number to make sale callings or fraud callings. Further, the stranger may provide the phone number to others, potentially leading to more unsolicited callings. To prevent phone numbers from being exposed to third parties, it might be useful to know who have exposed to third parties them. However, there is not a mechanism that may effectively reveal the source of exposure.

According to embodiments of the invention, a telephone agent 220 is provided for the protection of phone numbers. As shown in FIG. 2, telephone agent 220, which may be provided by an internet service provider, is communicatively coupled to a cellular network 210 and accessible by phones, such as smart phone 212_1, via the Internet (not shown). Smart phone users registered with telephone agent 220 may use codes in place of, or as the alternative to, phone numbers to make phone calls via telephone agent 220. In other words, the registered user do not have to use phone numbers to make calls. In addition, the codes themselves will be protected from arbitrary exposure in telephone agent 220, and exchange of them among users is trackable.

Now, assume smart phones 212_1, 212_2, 212_3, . . . and 212_n have phone numbers PN_1, PN_2, PN_3, . . . and PN_n respectively. And they have all registered with telephone agent 220. Hereinafter, owners of smart phones 212_1, 212_2, 212_3, . . . and 212_n may also be referred to as registered users of telephone agent 220, and will be denoted as U_1, U_2, U_3, . . . and U_n, respectively.

According to an embodiment of the invention, when a smart phone (for simplicity, also referred to as "phone" hereinafter) 212_i (i=1 . . . n) registers with telephone agent 220, telephone agent 220 will assign to it a unique code. In an embodiment, the code will be used instead of a phone number to designate the phone. Thus a code may be called "alternative code" meaning alternative to phone number, denoted as AC_i, According to an embodiment of the invention, a registration module 222 (FIG. 2) may be configured as a functional component of telephone agent 220 for handling registration related proceedings. Registration module 222 may use a hash algorithm, for example, to generate code AC_i. Specifically, registration module 222 will take phone number PN_i in the form of a numeric string, such as "138xxxxxxxx", as input of a hash function. The hash function outputs a hash value in the form of an alphanumeric string, such as "abcnnnnnnn", which will be code AC_i corresponding to phone number PN_i.

Those skilled in the art shall appreciate that any feasible algorithms may be employed to generate alternative codes. Therefore, the present invention is not limited to using hash algorithms as above. And the format of the code is not limited that shown above. In fact, it is even possible that code AC_i corresponding to phone number PN_i phone number PN_i itself, though it is not recommended.

Registration module 222 may save code AC_i in association with phone number PN_i to indicate their one-to-one corresponding relationship. In this way, telephone agent 220 may generate codes for all registered smart phones 212_1, 212_2, 212_3, . . . and 212_n. The generated codes are saved in association with respective phone numbers, so that all codes are uniquely mapped to respective phone numbers, as shown in Table 1 below.

TABLE 1

| Smart Phone | User_id | Phone Number | Alternative Code |
|---|---|---|---|
| 212_1 | U_1 | PN_1 | AC_1 |
| 212_2 | U_2 | PN_2 | AC_2 |

TABLE 1-continued

| Smart Phone | User_id | Phone Number | Alternative Code |
|---|---|---|---|
| 212_3 | U_3 | PN_3 | AC_3 |
| ... | ... | ... | ... |
| 212_n | U_n | PN_n | AC_n |

Figure 3:
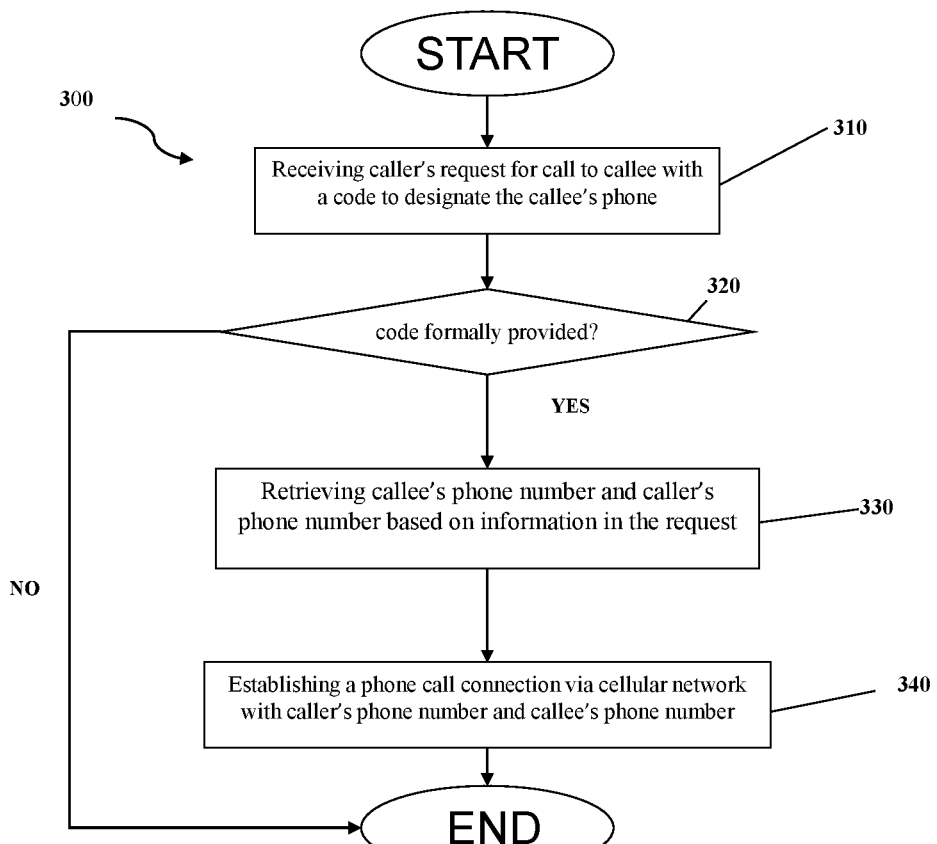
FIG. 3 is a flowchart illustrating the process of a method according to an embodiment of the present invention.

In the following, operation of the telephone agent 220 will be described by referring to FIG. 3. FIG. 3 is a flowchart illustrating a process 300 of a method according to an embodiment of the present invention. Process 300 is implemented at telephone agent 220.

In Step 310, telephone agent 220 receives a request, from a caller smart phone, for establishing telephone communication with a callee smart phone, wherein the request contains a code to designate the smart phone of the callee.

Step 310 is triggered as one of the smart phone users attempts to make a call to another via telephone agent 220. For example, assume user U_2 of smart phone 212_2 (referred to as "caller" here) wants to call user U_1 of smart phone 212_1 (referred to as "callee" here) via telephone agent 220. Caller U_2 may send a request to telephone agent 220 to indicate so. The information contained in the request includes, among other things, code AC_1 of smart phone 212_1 of the callee. The request is sent via the internet and received by telephone agent 220.

Next, it is to determine whether the request is valid according to pre-defined criteria. If it is valid, caller U_2 is allowed to make a call to callee U_1 by using alternative code AC_1. Otherwise, caller U_2 is prevented from making the call with alternative code AC_1.

So, in Step 320, it is checked whether code AC_1 contained in the request is formally provided to the caller. If it is determined that the code is not formally provided to the caller, the process will end. If it is determined that the code is formally provided to the caller, the process will proceed to Step 330.

In the context of the invention, an alternative code is said to be formally provided to the caller if the provision of the code is recorded and is retrievable by telephone agent 220. Alternative codes may be formally exchanged among registered users of telephone agent 220. Specifically, one user may provide an alternative code to another one. The provision of the code will be saved in a transaction record and may be verified later by telephone agent 220 by looking at the record. For example, user U_1 (e.g., a buyer visiting an online shopping website) may formally provide AC_1 to user U_2 (e.g., an online seller). Usually that means that user U_1 would allow user U_2 to use AC_1; in other words, U_2 is entitled to calling U_1 with AC_1. In addition, if user U_2 has formally obtained AC_1, user U_2 may in turn formally provide it to a third user U_3 (e.g., a courier). Then, user U_3 will be entitled to calling U_1 with AC_1.

In Step 330, telephone agent 220 retrieves phone number PN_2 of caller U_2 and phone number PN_1 of the callee U_1 based on the request. Specifically, phone number PN_2 and phone number PN_1 may be obtained from information contained in the request For example, telephone agent 220 may retrieve phone number PN_1 corresponding to alternative code AC_1 contained in the request from Table 1. In addition, telephone agent 220 may retrieve phone number PN_2 corresponding to user_id U_2 included as a part of user information included in the information contained in the request.

Next, in Step 340, telephone agent 220 establishes a phone call connection via cellular network 210 by using phone number PN_2 and phone number PN_1 respectively. As a result, caller U_2 may now conduct telephone communication with callee U_1 via cellular network 210.

In practice, telephone agent 220 may have a functional component, authorizer 226, configured to enable existing Internet-to-telecommunications network service, like Skype™. Then authorizer 226 may dial phone number PN_2 and phone number PN_1 respectively to set two channels, and link the two channels via internet so that the phone call connection via cellular network 210 may be established between smart phone 212_2 and smart phone 212_1.

In practice, steps 320, 330 and 340 may be implemented by authorizer 226 of telephone agent 220.

The process 300 of a method implemented at telephone agent 220 according to an embodiment of the present invention is thus described. Next, more implementing details will be provided with respect to Step 320 of process 300.

As previously stated, in Step 320, telephone agent 220 will check whether alternative code AC_1 contained in the request is formally provided to the caller. In the context of the invention, alternative codes may be formally exchanged among registered users of telephone agent 220. In other words, one user may provide an alternative code to another one, and the fact will be recorded by the telephone agent 220. For example, user U_1 may formally provide AC_1 to user U_2. Usually that means that user U_1 would allow user U_2 to use AC_1; in other words, U_2 is entitled to calling U_1 with AC_1. In addition, if user U_2 has formally obtained AC_1, user U_2 may in turn formally provide it to a third user U_3. Then, user U_3 will be entitled to calling U_1 with AC_1. In the context of the invention, an alternative code is said to be formally provided to the caller if the provision of the alternative code is recorded and is retrievable by telephone agent 220.

Those skilled in the art may appreciate that the provision of the alternative code may be recorded in different ways. For example, to meet the pre-defined criteria, the provision of the alternative code may be saved in a table that is readily retrievable.

Inventors of this invention, however, specifically proposes to employ the well-known block chain technology and use a block chain transaction record to save the provision of an alternative code.

Correspondingly, according to an embodiment of the invention, the checking whether the code is formally provided to the caller comprises checking whether there is a block chain transaction record indicating that the code was provided to the caller by either the callee or a third user.

In the following paragraphs, description will be provided as to how to employ existing the block chain technology to save the provision of an alternative code as a block chain transaction record.

According to an embodiment of the invention, a block chain is established and maintained for each of smart phones 212_1, 212_2, 212_3, . . . and 212_n. A block chain transaction record is generated and added to a block chain as a result of a block chain transaction in response to the code being provided to the caller by either the callee or a third user. In other words, the provision of alternative code AC_1 from one user to another U_2 may be saved as a transaction record in a block chain.

According to an embodiment of the invention, block chain is associated with the smart phone of the callee. In other words, the block chain transaction record may be located in a block chain associated with the smart phone of the callee 212_1 or user U_1.

Correspondingly, according to an embodiment of the invention, the checking whether the is formally provided to the caller may comprise checking whether there is a block chain transaction record indicating that the code was provided to the caller by either the callee or a third user. In other words, by checking information in the block chain associated with the callee's phone, it may be determined whether or not alternative code AC_1 has been formally provided to caller U_2 by either callee U_1 or a third user other than U_1.

Figure 4A:
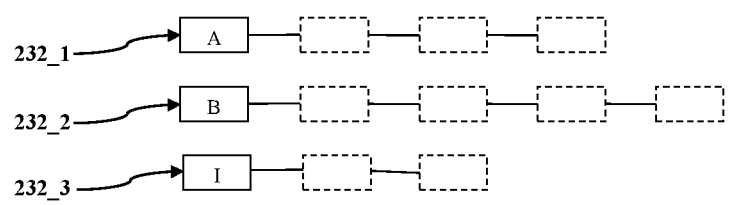
FIG. 4A illustrates generation and processing of example block chains according to embodiments of the present invention.

Referring to FIG. 4A, which shows example block chains established according to embodiments of the invention. For simplicity, there are only illustratively shown three block chains 232_1, 232_2 and 232_3. They are respectively corresponding to smart phones 212_1, 212_2 and 212_3. According to an embodiment of the invention, the block chains are established by registration module 222 of telephone agent 220 when the smart phones register with telephone agent 220.

In block chain 232_1 of FIG. 4A, initially there is only one block A, hereinafter also referred to as "root block", as shown by the solid line block. Root block A contains at least phone number PN_1 and its corresponding alternative code AC_1, the latter being generated by telephone agent 220 as previously mentioned.

Root block A may contain additional registration information including, without limitation, user_id, registration time, etc.

Similarly, block B is a root block of block chain 232_2, containing at least phone number PN_2 and alternative code AC_2. And block I is a root block of block chain 232_3, containing at least phone number PN_3 and alternative code AC_3.

Block chains 232_1, 232_2 and 232_3 may be stored in a block chain network 230, as shown in FIG. 2, in the form a database. Block chain network 230 is maintained by telephone agent 220.

Figure 4B:
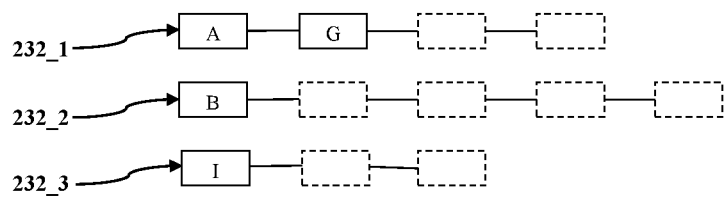
FIG. 4B illustrates generation and processing of example block chains according to embodiments of the present invention.

Refer to FIG. 4B. According to embodiments of the invention, one user may provide his/her own alternative code to another user via telephone agent 220. The provision of the alternative code can be saved in a block of the block chain corresponding to the alternative code. For example, user U_1 may provide AC_1 to user U_2. This fact can be recorded by adding a new block G into block chain 232_1 corresponding alternative code AC_1, as depicted in FIG. 4B. Block G may contain at least the following information:
<SENDER: 212_1; RECEIVER: 212_2>, which means that smart phone 212_1 ("SENDER") has provided its AC_1 to smart phone 212_2 ("RECEIVER").

Figure 4C:
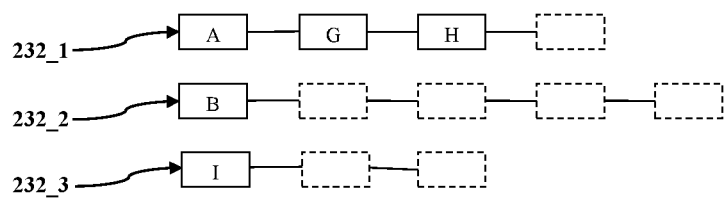
FIG. 4C illustrates generation and processing of example block chains according to embodiments of the present invention.

Refer to FIG. 4C. According to embodiments of the invention, a user may also provide another user's alternative code to a third user via telephone agent 220. The provision of the alternative code will be recorded in a block of the block chain corresponding to the alternative code in the same way as in FIG. 4B. For example, user U_2 have received AC_1 from U_1. Then user U_2 may in turn provide AC_1 to user U_3. This fact can be recorded by adding a new block H into block chain 232_1 corresponding to alternative code AC_1, as depicted in FIG. 4C. Block H may contain at least the following information:
<SENDER: 212_2; RECEIVER: 212_3>, which means that smart phone 212_2 ("SENDER") has provided AC_1 to smart phone 212_3 ("RECEIVER").

Figure 4D:
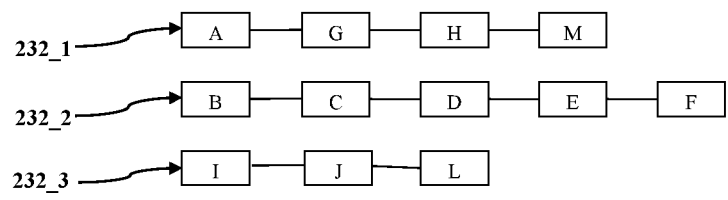
FIG. 4D illustrates generation and processing of example block chains according to embodiments of the present invention.

In this way, each of the block chains may be expanded over time. For example, as shown in FIG. 4D, at a certain point of time, block chain 232_1 comprises blocks A, G, H and M. Block chain 232_2 comprises blocks B, C, D, E and F. And block chain 232_3 comprises blocks I, J and L.

The above paragraphs in connection with FIGS. 4A to 4B have described establishing block chains for individual smart phones and recording the provision of an alternative code in a block of the block chain corresponding to the alternative code.

According to an embodiment of the invention, the block (also referred to as "block chain transaction record" or simply "transaction record" in this specification) is generated and added to the block chain as a result of a block chain transaction in response to the alternative code being provided to the caller by another user. In other words, the process of the provision of an alternative code from one user to another is implemented as a block chain transaction.

The concept of block chain transaction is well known in prior art block chain technology. Those skilled in the art shall also be familiar with how a block chain transaction is executed. Thus, details of the execution of block chain transaction will not be provided here in length so as not to obscure the invention. However, for better understanding of the invention, it would be advantageous to give a simple example in the following paragraphs.

Assume, for the purpose of the invention, smart phones 212_1, 212_2, 212_3, . . . and 212_n as well as transaction module 224 of telephone agent 220 constitute participant nodes of a block chain system. Transaction module 224 and each of the smart phones are appropriately configured to enable block chain operations, with transaction module 224 serving as a control node.

For example, if user U_1 would provide AC_1 to user U_2, as is described with reference to FIG. 4B, a block chain transaction request may be raised from smart phone 212_1 to transaction module 224. The request may contain, among other things, the following information:

- Transaction record: record={sender: U_1,
  receiver: U_2,
  alternative code: AC_1 }
- U_1's signature In response to the request, transaction module 224 generates a block chain transaction which contains the following information:

- Transaction ID that uniquely identifies the transaction;
- Public key of U_1;
- Signature of U_1, encrypted by U_1's private key;
- Chaincode_operation
  //Record transaction details of sending which alternative code to which receiver. The operation can be represented by following pseudocode//
  Function_ChaincodeOperation(String: sender, String: receiver, String: alphanumeric)
  {
    record={sender: U_1,
      receiver: U_2,
      alternative code :AC_1}
    return record
  }
- Chain code and chain code hash
  //The chain source code above and its hash value which are used for other nodes to verify if the operation result matches the source chain code and its hash value.//

Transaction module 224 may broadcast the block chain transaction to all participant nodes. Then, other participant nodes 212_2, 212_3, . . . and 212_n_ may use U_1's public key, chain code and chain code hash value to verify the transaction. If a certain number of nodes (the number may be pre-defined to include most or all nodes) have verified and agreed, Transaction module 224 may add block G to U_1's block chain 232_1.

After being provided with AC_1 in this way, smart phone 212_2 is enabled to use AC_1 to make a call to smart phone 212_1 via telephone agent 220, as described in connection with FIG. 3.

As previously mentioned, a user may also provide another user's alternative code to a third user via telephone agent 220. In a similar way, the fact may be recorded in a transaction record of the block chain corresponding to the alternative code. For example, after obtaining AC_1 from user U_1, user U_2 may want to share it with user U_3. User U_2 may provide AC_1 to user U_3 in a similar way as above. This fact may be recorded in a new block H which is added to block chain 232_1 corresponding to AC_1, as depicted in FIG. 4C. The information recorded in block H might look like <SENDER: 212_2; RECEIVER: 212_3>, from which it may be determined that smart phone 212_2 has provided smart phone 212_3 with AC_1.

In the above, the method of protecting phone number from being exposed to third parties according to embodiments of the invention is described.

With the invention, phone users are assigned codes that are uniquely associated with their phone numbers. The users may call each other using the codes as the alternative to the phone numbers, especially in conducting business transactions where, for example, an online shopping buyer would not like to expose his phone number to an online seller. Because users' phone numbers are not exchanged, the risk of the phone numbers themselves being exposed to third parties (e.g., leaked) is reduced.

Furthermore, since a first user may call a second user via telephone agent 220 only if the first user is formally provided with the second user's alternative code, the second user may effectively avoid being disturbed by unsolicited phone calls via telephone agent 220. If the second user doubts that an unsolicited phone call is due to exposure of his alternative code to a third party, it is easy for him to find out the source of exposure from the block chain associated with him. Because the block chain is temper resistant, the finding out may serve as evidence for possible legal actions against the act of exposure if. In this way, actions of arbitrarily exposure alternative codes might be mitigated so that the alternative codes may also be effectively protected from being exposed to third parties. For example, an online shopping buyer (e.g., U_1) may formally provide his alternative code to an online seller (e.g., U_2) to facilitate a transaction. I would be normal for the seller to formally provide the code to a courier (e.g., U_3) for delivering the goods ordered by the buyer. Should the courier sell the code to another online seller by formally providing the code, for example by a block chain transaction, the courier might be facing potential legal action brought against him with the formal record, such as the block chain record, of the provision as supportive evidence.

Under the same inventive concept, the invention also provides a system which comprises one or more processors; a memory coupled to at least one of the one or more processors, a set of computer program instructions stored in the memory and executed by at least one of the one or more processors in order to perform actions of: receiving a request, from a caller smart phone, for establishing telephone communication with a smart phone of the callee, wherein the request contains a code to designate the smart phone of the callee; checking whether the code is formally provided to the caller; and in response to determining that the code is formally provided to the caller, retrieving the phone number of the caller and the phone number of the callee based on the request; and establishing a phone call connection via a cellular network with the phone number of the caller and the phone number of the callee.

According to an embodiment of the invention, wherein the code is uniquely corresponding to the phone number of the callee.

According to an embodiment of the invention, the checking whether the code is formally provided to the caller comprises checking whether there is a block chain transaction record indicating that the code was provided to the caller by either the callee or a third user.

According to an embodiment of the invention, the block chain transaction record is generated and added to a block chain as a result of a block chain transaction in response to the code being provided to the caller by either the callee or a third user.

According to an embodiment of the invention, the block chain is associated with the smart phone of the callee.

The invention also provides a computer program product which comprises a computer readable storage medium having program instructions embodied therewith, wherein the program instructions being executable by a device to perform a method which comprises: receiving a request, from a caller smart phone, for establishing telephone communication with a smart phone of the callee, wherein the request contains a code to designate the smart phone of the callee; checking whether the code is formally provided to the caller; and in response to determining that the code is formally provided to the caller, retrieving the phone number of the caller and the phone number of the callee based on the request; and establishing a phone call connection via a cellular network with the phone number of the caller and the phone number of the callee.

According to an embodiment of the invention, wherein the code is uniquely corresponding to the phone number of the callee.

According to an embodiment of the invention, the checking whether the code is formally provided to the caller comprises checking whether there is a block chain transaction record indicating that the code was provided to the caller by either the callee or a third user.

According to an embodiment of the invention, the block chain transaction record is generated and added to a block chain as a result of a block chain transaction in response to the code being provided to the caller by either the callee or a third user.

According to an embodiment of the invention, the block chain is associated with the smart phone of the callee.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A system comprising:
one or more processors;
a memory coupled to at least one of the one or more processors; and
a set of computer program instructions stored in the memory and executed by at least one of the one or more processors in order to perform actions of:
   receiving a request, from a smart phone of a caller, for establishing telephone communication with a smart phone of a callee, wherein the request contains a code to identify the smart phone of the callee,
   checking whether the code is recorded in a transaction record, whether the transaction record has a record of the smart phone of the callee providing the code to the smart phone of the caller, and whether the code is retrievable by the one or more processors, and
   in response to determining that the code is recorded in the transaction record, that the transaction record has a record of the smart phone of the callee providing the code to the smart phone of the caller, and that the code retrievable by the one or more processors, retrieving a phone number of the caller and a phone number of the callee based on the request,
   establishing a phone call connection via a cellular network with the phone number of the caller and the phone number of the callee;
   transmitting, by the smart phone of the caller, the code to a third smart phone;
   recording, in the transaction record, the smart phone of the caller transmitting the code to the third smart phone;
   receiving a second request, from the third smart phone, for establishing telephone communication with the smart phone of the callee, wherein the second request contain the code;
   checking whether the transaction record has a record of the smart phone of the caller providing the code to the third smart phone;
   in response to determining the transaction record has a record of the smart phone of the caller providing the code to the third smart phone, retrieving a phone number of the third smart phone and the phone number of the callee based on the second request, and
   establishing a second phone call connection via the cellular network with the phone number of the third smart phone and the phone number of the callee.

2. The system of claim 1, wherein the code is associated with the phone number of the callee.

3. The system of claim 1, further comprising checking whether there is a block chain transaction record indicating that the code was provided to the caller by the callee.

4. The system of claim 3, further comprising generating the block chain transaction record.

5. The system of claim 3, further comprising adding the block chain transaction record to a block chain based on a block chain transaction in response to the code being provided to the caller by the callee.

6. The system of claim 5, wherein the block chain is associated with the smart phone of the callee.

7. The system of claim 1, wherein the code further identifies the smart phone of the caller.

8. A computer program product comprising a computer readable storage medium having program instructions embodied therewith, wherein the program instructions being executable by a device to perform a method comprising:
   receiving a request, from a smart phone of a caller, for establishing telephone communication with a smart phone of a callee, wherein the request contains a code to identify the smart phone of the callee,
   checking whether the code is recorded in a transaction record, whether the transaction record has a record of the smart phone of the callee providing the code to the smart phone of the caller, and whether the code is retrievable by one or more processors, and
   in response to determining that the code is recorded in the transaction record, that the transaction record has the record of the smart phone of the callee providing the code to the smart phone of the caller, and that the code retrievable by the one or more processors, retrieving a phone number of the caller and a phone number of the callee based on the request,
   establishing a phone call connection via a cellular network with the phone number of the caller and the phone number of the callee;
   transmitting, by the smart phone of the caller, the code to a third smart phone;
   recording, in the transaction record, the smart phone of the caller transmitting the code to the third smart phone;
   receiving a second request, from the third smart phone, for establishing telephone communication with the smart phone of the callee, wherein the second request, contains the code;
   checking whether the transaction record has a record of the smart phone of the caller providing the code to the third smart phone;
   in response to determining the transaction record has a record of the smart phone of the caller providing the code to the third smart phone, retrieving a phone number of the third smart phone and the phone number of the callee based on the request, and
   establishing a second phone call connection via the cellular network with the phone number of the third smart phone and the phone number of the callee.

9. The computer program product of claim 8, wherein the code is associated with the phone number of the callee.

10. The computer program product of claim 8, further comprising checking whether there is a block chain transaction record indicating that the code was provided to the caller by the callee.

11. The computer program product of claim 10, further comprising generating the block chain transaction record.

12. The computer program product of claim 10, further comprising adding the block chain transaction record to a block chain based on a block chain transaction in response to the code being provided to the caller by the callee.

13. The computer program product of claim 12, wherein the block chain is associated with the smart phone of the callee.

14. The computer program product of claim 8, further comprising in response to determining that the code is not formally provided to the caller, not establishing the phone call connection via a cellular network.

* * * * *